United States Patent
Kupferman et al.

(10) Patent No.: US 7,215,496 B1
(45) Date of Patent: May 8, 2007

(54) DISK DRIVE HAVING ADAPTIVELY-SIZED SECTORS TO COMPENSATE FOR DISK ECCENTRICITY

(75) Inventors: Hanan Kupferman, Diamond Bar, CA (US); Philip S. Gordon, Santa Ana, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/969,828

(22) Filed: Oct. 20, 2004

(51) Int. Cl.
*G11B 5/09* (2006.01)

(52) U.S. Cl. .................................................. 360/51

(58) Field of Classification Search ............... None
See application file for complete search history.

(56) References Cited

U.S. PATENT DOCUMENTS

| | | | | |
|---|---|---|---|---|
| 5,377,178 A | * | 12/1994 | Saito et al. ............ | 360/77.08 |
| 5,406,535 A | * | 4/1995 | Seo et al. .............. | 360/78.06 |
| 5,937,435 A | * | 8/1999 | Dobbek et al. ........ | 711/202 |
| 6,167,461 A | * | 12/2000 | Keats et al. ........... | 360/77.08 |
| 6,597,529 B1 | * | 7/2003 | DeRosa .................. | 360/78.14 |
| 6,611,391 B1 | | 8/2003 | Murphy et al. | |
| 6,972,540 B1 | * | 12/2005 | Wang et al. ........... | 360/78.12 |
| 7,068,451 B1 | * | 6/2006 | Wang et al. ........... | 360/51 |

* cited by examiner

*Primary Examiner*—Wayne Young
*Assistant Examiner*—Glenda P. Rodriguez
(74) *Attorney, Agent, or Firm*—Jason T. Evans, Esq.; Young Law Firm

(57) ABSTRACT

A disk drive includes an actuator assembly having a read/write head, a spindle motor, a disk mounted for rotation on the spindle motor, a wedge-to-wedge timer and a sector size selector. The disk includes a recording surface having a plurality of tracks and each track includes a plurality of servo wedges. The recording surface has at least one data sector between circumferentially adjacent servo wedges on each track. The wedge to wedge timer measures the time elapsed between at least two successive detections of circumferentially adjacent servo wedges and outputs a wedge-to-wedge correction signal that is dependent upon the measured elapsed time. The sector size selector outputs a sector size signal that changes according to the wedge-to-wedge correction signal. In turn, the sector size signal determines the size of the next data sector on the recording surface of the disk.

9 Claims, 3 Drawing Sheets

US 7,215,496 B1

DISK DRIVE HAVING ADAPTIVELY-SIZED SECTORS TO COMPENSATE FOR DISK ECCENTRICITY

BACKGROUND OF THE INVENTION

1. Field of the Invention

The present invention relates to disk drives. More particularly, the present invention relates to disk drives that are configured to compensate for spindle motor speed variations and disk eccentricity.

2. Description of the Prior Art

All disk drives, to varying extents, suffer from a condition in which the media are not mounted at the exact center of rotation of the spindle motor. This condition manifests itself as a certain degree of eccentricity as the disk is rotated by the spindle motor. Such eccentricity may be caused by a condition called "disk slip" in which the disk platters slip relative to the clamp and/or spacers mounting the media onto the spindle motor, which may occur as a result of a shock event occasioned by dropping or jarring the drive, for example. Alternatively, disk eccentricity may be caused, for example, by an inexact installation of pre-recorded media (from a media writer, for example) on the drive's spindle motor. Some eccentricity is unavoidable, as the center opening of the disk must, by definition, be larger than the spindle of the spindle motor onto which it must be fitted.

When a disk or disks rotate with eccentricity, the result is once per revolution (OPR) timing errors, also referred to as a "big run-out". In contemporary drives, servo sectors of servo information are interspersed with data sectors circumferentially in concentric tracks around the recording surface or surfaces of the disk or disks. The format of the tracks calls for regularly spaced embedded servo sectors (also called servo wedges) containing servo information therein. Between the embedded servo sectors are a number of data sectors, which are configured to store user addressable data. When a disk rotates with eccentricity, the wedge-to-wedge timing will be modulated by the OPR timing error in a sinusoidal fashion as the disk rotates about the spindle, with the timing error being worse toward the inner diameter (ID) of the disk. This variation in the wedge-to-wedge timing due to disk eccentricity causes a certain degree of uncertainty in the timing of the servo control signals and the placement of user data. This timing uncertainty must be accounted for in the allocation of the various fields and the gaps interspersed between the data fields, which results in a loss of format efficiency, as compared to an ideal situation in which such timing uncertainty were minimized. For a given drive having 95,000 Tracks Per Inch (TPI) for example, a disk slip equivalent to a distance of 300 tracks in a 2.5 inch disk drive results in a 0.6% linear velocity uncertainty and a not insignificant 8% loss of user accessible storage capacity.

From the foregoing, it may be appreciated that methods for reducing the effects of disk eccentricity on the user addressable data spaces of the disk are needed.

SUMMARY OF THE INVENTION

According to an embodiment thereof, the present invention is a disk drive that includes an actuator assembly having a read/write head; a spindle motor; a disk mounted for rotation on the spindle motor and including a recording surface having a plurality of tracks, each track including a plurality of servo wedges, the recording surface having at least one data sector between circumferentially adjacent servo wedges on each track, the disk being mounted for rotation on the spindle motor; a wedge to wedge timer configured to measure a time elapsed between at least two successive detections of circumferentially adjacent servo wedges and to output a wedge to wedge correction signal that is dependent upon the measured elapsed time, and a sector size selector configured to output a sector size signal that changes according to the wedge to wedge correction signal, the sector size signal determining a size of a next data sector on the recording surface of the disk.

The disk may be mounted on the spindle motor with a degree of eccentricity such that a linear velocity of the rotating recording surface relative to the read/write head changes as a result of the eccentricity and the data sector size correction signal may be modulated according to the linear velocity of the rotating recording surface. The disk drive may further include a clock configured to generate a fixed frequency clock signal, the clock signal being coupled to the sector size collector and the sector size signal may be asserted for an integer number of clock cycles of the clock signal.

According to another embodiment thereof, the present invention is a method for compensating for once per revolution timing error in a disk drive, the method comprising the steps of: measuring a wedge to wedge timing between at least two circumferentially adjacent servo wedges on a recording surface of a rotating disk of the disk drive, the recording surface including at least one data sector between circumferentially adjacent servo wedges; generating a data sector size correction signal that is dependent upon the measured wedge to wedge timing; modulating a size of a next data sector on the recording surface of the disk according to the generated data sector size correction signal.

The disk may be mounted on the spindle motor with a degree of eccentricity such that a linear velocity of the rotating recording surface relative to the read/write head changes as a result of the eccentricity and the method further may include a step of modulating the data sector size correction signal according to the linear velocity of the rotating recording surface. The drive may further include a clock configured to generate a fixed frequency clock signal, the clock signal being coupled to the sector size collector and the method further may include a step of asserting the sector size signal for an integer number of clock cycles of the clock signal.

According to still another embodiment thereof, the present invention is a mobile host device, comprising an enclosure; a disk drive coupled to the enclosure, the disk drive having a spindle motor that rotates a disk, the disk drive including an actuator assembly having a read/write head; a disk mounted for rotation on the spindle motor and including a recording surface having a plurality of tracks, each track including a plurality of servo wedges, the recording surface having at least one data sector between circumferentially adjacent servo wedges on each track, the disk being mounted for rotation on the spindle motor; a wedge to wedge timer configured to measure a time elapsed between at least two successive detections of circumferentially adjacent servo wedges and to output a wedge to wedge correction signal that is dependent upon the measured elapsed time, and a sector size selector configured to output a sector size signal that changes according to the wedge to wedge correction signal, the sector size signal determining a size of a next data sector on the recording surface of the disk.

The disk may be mounted on the spindle motor with a degree of eccentricity such that a linear velocity of the rotating recording surface relative to the read/write head changes as a result of the eccentricity and the data sector size correction signal may be modulated according to the linear velocity of the rotating recording surface. A clock may be configured to generate a fixed frequency clock signal, the clock signal being coupled to the sector size collector and the sector size signal may be asserted for an integer number of clock cycles of the clock signal.

DESCRIPTION OF THE PREFERRED EMBODIMENTS

Figure 1:
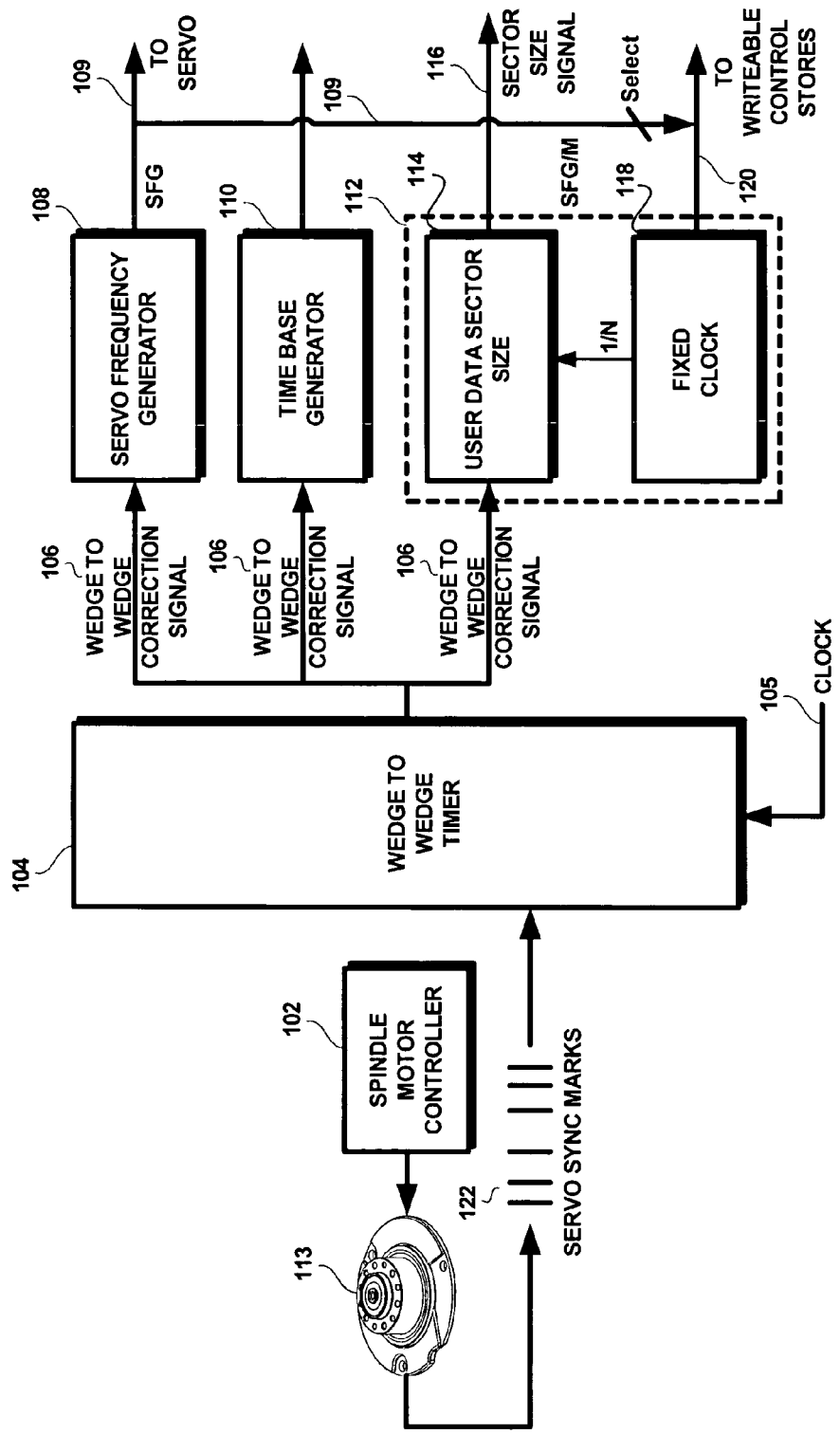
FIG. 1 is a block diagram of a control circuit having a sector size selector configured to output a sector size signal that determines the size of the next data sector on the recording surface of the disk.

FIG. 1 is a block diagram of a control circuit having a sector size selector configured to output a sector size signal that determines the size of the next data sector on the recording surface of the disk, according to an embodiment of the present invention. As shown therein, a spindle motor 113 rotates under the control of spindle motor controller 102. As the disk rotates under the read/write head(s) of the actuator assembly (shown in FIG. 2), the embedded servo sync marks are detected, as suggested at 122. As also suggested by reference numeral 122, the detected servo sync marks, due to the eccentricity of the disk(s), are not detected at precisely regular intervals. Due to the apparent change in linear velocity of the surface of the recording surface of the rotating disk, the timing of these servo sync marks varies in a generally sinusoidal fashion.

According to embodiments of the present invention, these timing variations are detected and measured by the wedge to wedge timer 104, and used to calculate the space available for user data after the next servo sync mark. The wedge to wedge timer 104 generates a wedge to wedge correction signal 106. For example, two registers internal to the wedge to wedge timer 104 may be used to measure differences in successive detections of servo sync marks on the recording surface of the rotating disk to determine the wedge to wedge timing error. The wedge to wedge correction signal 106 changes according to changes in the linear velocity of the recording surface of the disk 200 (one such disk 200 being shown in FIG. 2) relative to the head stack assembly 150. As shown in FIG. 1, the wedge to wedge correction signal 106 may be fed to the servo frequency generator 108, a time base generator 110 and a user data sector size selector 114 within the controller 112. Indeed, the wedge to wedge correction signal 106, according to an embodiment of the present invention, modifies the servo frequency output SFG 109 of the servo frequency generator 108, the frequency at which the data is written, as output by the time base generator 110 and changes the size of the next data sector, as controlled by the sector size signal 116 output from the user data sector size selector 114.

As shown, the user data sector size selector 114 may be synchronized to a fixed clock 118 of frequency N and controlled by the wedge to wedge correction signal 106 to output the sector size signal 116. The wedge to wedge correction signal 106 may then control the width of the next user data sector size by controlling the number of clock signals from the fixed clock 118 during which the sector size signal 116 is asserted. That is, the size of the next user data sector size is controlled by the sector size signal 116 and this sector size signal 116 is asserted for a controllable integer number of clock cycles of the clock signal output from the fixed clock 118. An output of the fixed clock may also be coupled to a Writeable Control Stores (WCS), a state machine that controls the opening and closing of the servo gate. The output SFG/M 109 of the servo frequency generator 108, modulated by the wedge to wedge correction signal 106, is also selectively fed to the servo Writeable Control Stores, as shown in FIG. 1.

The output of the time base generator 110 (which is the same for both read and write operations) is also modulated by the wedge to wedge correction signal 106. Therefore, the time base generator output is also modulated by the detected changes in the linear velocity of the rotating recording surface of the disk to the head stack assembly 150.

According to an embodiment of the present invention, the wedge to wedge timer 104 is fed by a clock signal 105 and outputs a wedge to wedge correction signal 106 that may be updated each time a new servo sync mark is detected. The timing error relative to the previously detected servo sync mark may then be calculated and fed to firmware to update the servo frequency generator 108, the time base generator 110 and the user data sector size selector 114.

Figure 2:
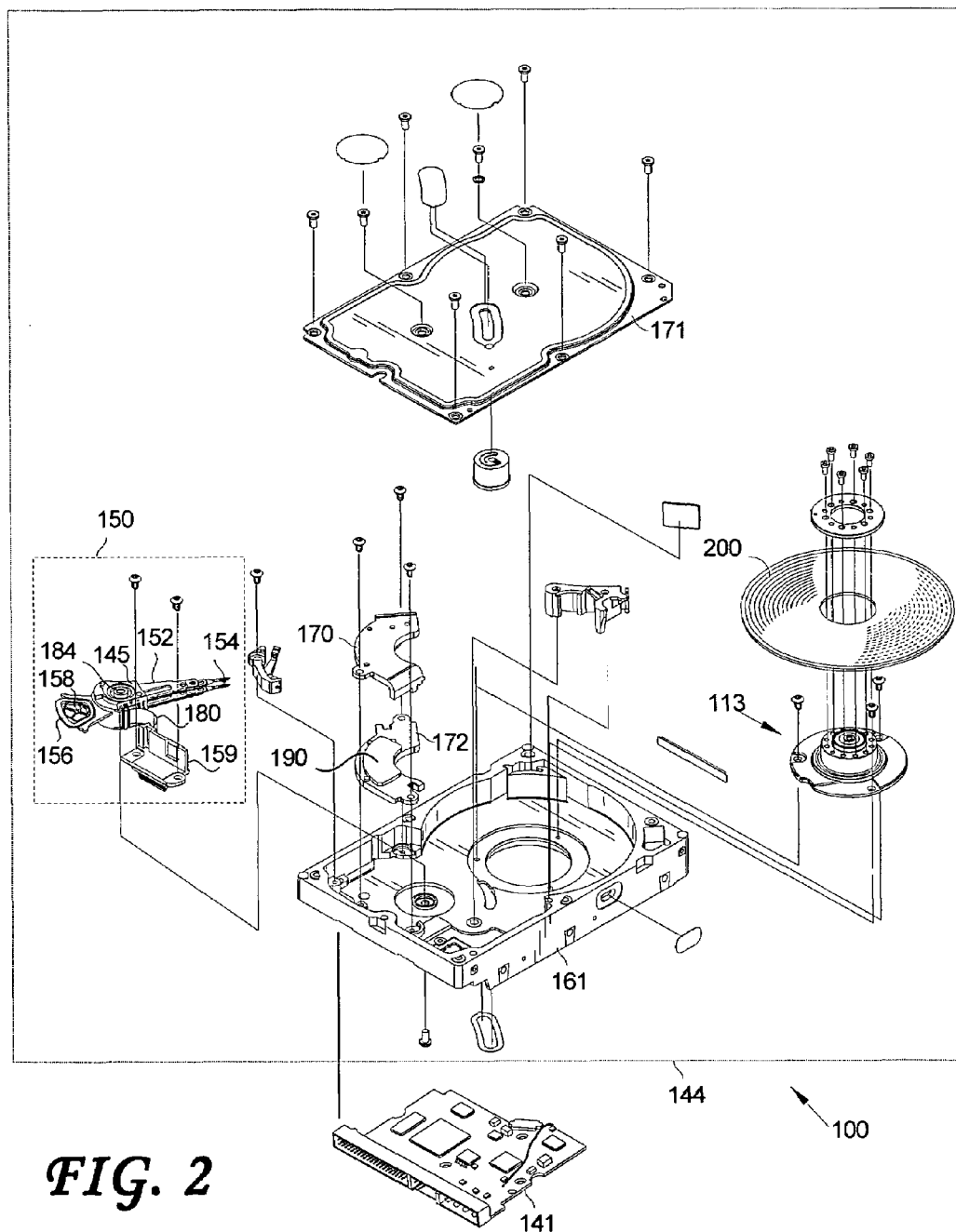
FIG. 2 is an exploded view of a disk drive incorporating the control circuit of FIG. 1, according to an embodiment of the present invention.
Figure 3:
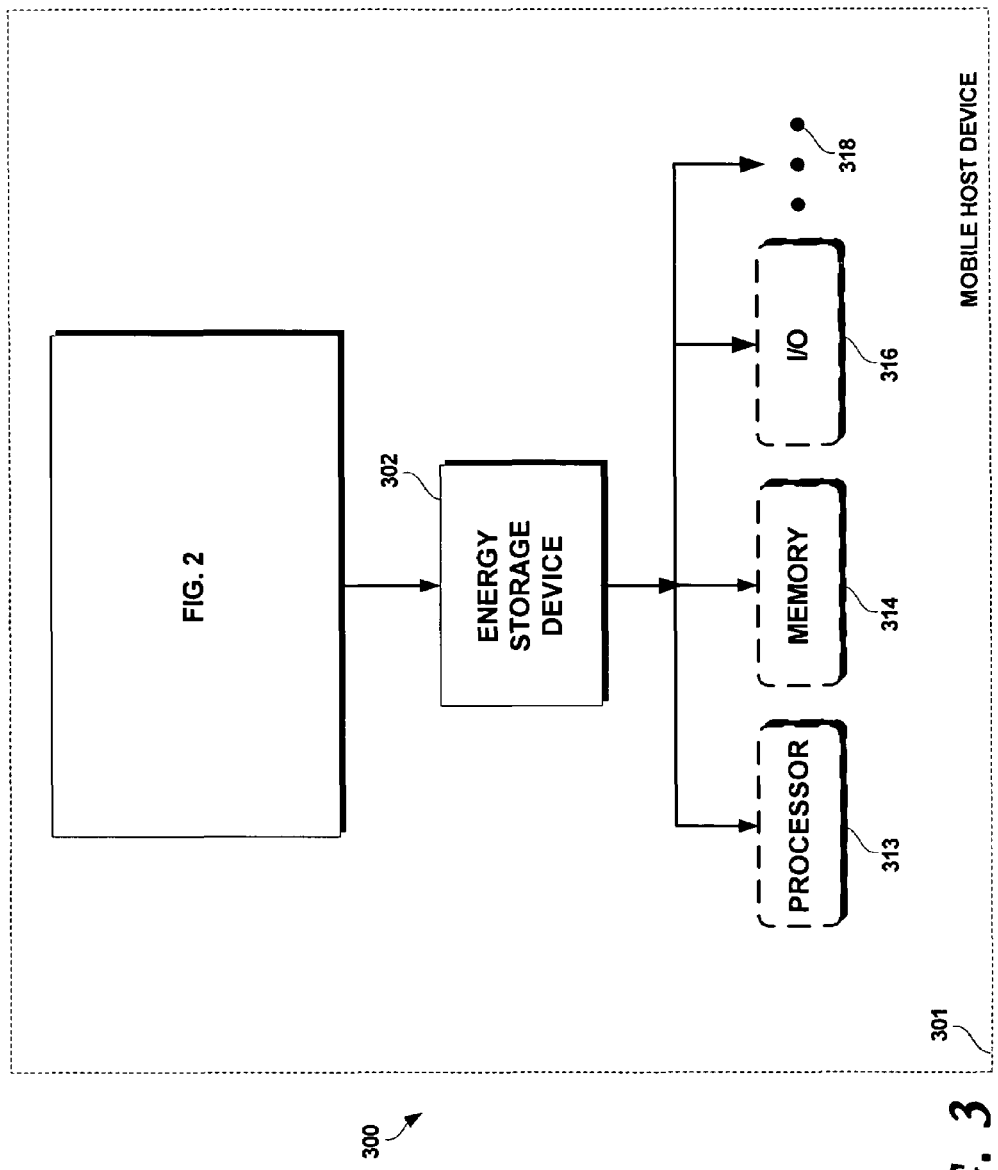
FIG. 3 is a block diagram of a mobile host device incorporating a disk drive constructed and configured to operate in accordance with an embodiment of the present invention.

FIG. 2 shows the principal components of a magnetic disk drive 100 according to an embodiment of the present invention. With reference to FIG. 2, the disk drive 100 comprises a head disk assembly (HDA) 144 and a printed circuit board assembly (PCBA) 141. The elements shown and described in FIG. 1 may be at least partially incorporated within the PCBA 141. The HDA 144 includes a base 161 and a cover 171 attached to the base 161 that collectively house one or more disks 200 (only one disk 200 is shown in FIG. 2), a spindle motor 113 attached to the base 161 for rotating the disk 200, a head stack assembly (HSA) 150, and a pivot bearing cartridge 184 that rotatably supports the HSA 150 on the base 161. The spindle motor 113 rotates the disk 200 at a constant angular velocity, subject to the above-described variations. The HSA 150 comprises a swing-type or rotary actuator assembly 152, at least one head gimbal assembly that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly (ies) that, in turn, support the head that includes the read/write transducer(s) for reading and writing to the disk 200. The HSA 150 is pivotally secured to the base 161 via the pivot-bearing cartridge 184 so that the read/write transducer (s) at the distal end of the suspension assembly(ies) may be moved over the recording surface(s) of the disk(s) 200. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 190 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 900.

Advantageously, a disk drive constructed and operating according to an embodiment of the present invention may be incorporated into a mobile host device 300 (e.g., a camera, telephone, music player, PDA, and the like) whose constituent parts may draw electrical energy from an energy storage device 302, such as a battery, for example. The mobile host device may include, for example, a processor 312, memory 314, Input/Output devices 316 (display, speakers, etc.) and others, collectively referenced by numeral 318. These elements may be contained in an enclosure 301. According to an embodiment of the present invention, when the disk 200 or disks 200 are mounted with eccentricity on the spindle motor 113, or when the mobile host device 300 is subjected to a shock event that jars the disk(s) 200 away from the rotational center of the spindle motor 113, embodiments of the present invention may operate to prevent undue degradation in the format efficiency by modulating the user data sector size by the timing variations between successive servo sync marks of circumferentially adjacent wedges, as shown and detailed herein.

What is claimed is:

1. A disk drive, comprising:
   an actuator assembly having a read/write head;
   a spindle motor;
   a disk mounted for rotation on the spindle motor and including a recording surface having a plurality of tracks, each track including a plurality of servo wedges, the recording surface having at least one data sector between circumferentially adjacent servo wedges on each track, the disk being mounted for rotation on the spindle motor;
   a wedge to wedge timer configured to measure a time elapsed between at least two successive detections of circumferentially adjacent servo wedges and to output a wedge to wedge correction signal that is dependent upon the measured elapsed time;
   a sector size selector configured to output a sector size signal that changes according to the wedge to wedge correction signal, the sector size signal determining a size of a next data sector on the recording surface of the disk.

2. The disk drive of claim 1, wherein the disk is mounted on the spindle motor with a degree of eccentricity such that a linear velocity of the rotating recording surface relative to the read/write head changes as a result of the eccentricity and wherein the data sector size correction signal is modulated according to the linear velocity of the rotating recording surface.

3. The disk drive of claim 1, further including a clock configured to generate a fixed frequency clock signal, the clock signal being coupled to the sector size collector and wherein the sector size signal is asserted for an integer number of clock cycles of the clock signal.

4. The method of claim 1, wherein the disk is mounted on the spindle motor with a degree of eccentricity such that a linear velocity of the rotating recording surface relative to the read/write head changes as a result of the eccentricity and wherein the method further includes a step of modulating the data sector size correction signal according to the linear velocity of the rotating recording surface.

5. The method of claim 1, further including a clock configured to generate a fixed frequency clock signal, the clock signal being coupled to the sector size collector and wherein the method further includes a step of asserting the sector size signal for an integer number of clock cycles of the clock signal.

6. A method for compensating for once per revolution timing error in a disk drive, the method comprising the steps of:
   measuring a wedge to wedge timing between at least two circumferentially adjacent servo wedges on a recording surface of a rotating disk of the disk drive, the recording surface including at least one data sector between circumferentially adjacent servo wedges;
   generating a data sector size correction signal that is dependent upon the measured wedge to wedge timing;
   modulating a size of a next data sector on the recording surface of the disk according to the generated data sector size correction signal.

7. A mobile host device, comprising:
   an enclosure;
   a disk drive coupled to the enclosure, the disk drive having a spindle motor that rotates a disk, the disk drive including:
   an actuator assembly having a read/write head;
   a disk mounted for rotation on the spindle motor and including a recording surface having a plurality of tracks, each track including a plurality of servo wedges, the recording surface having at least one data sector between circumferentially adjacent servo wedges on each track, the disk being mounted for rotation on the spindle motor;
   a wedge to wedge timer configured to measure a time elapsed between at least two successive detections of circumferentially adjacent servo wedges and to output a wedge to wedge correction signal that is dependent upon the measured elapsed time;
   a sector size selector configured to output a sector size signal that changes according to the wedge to wedge correction signal, the sector size signal determining a size of a next data sector on the recording surface of the disk.

8. The mobile host device of claim 7, wherein the disk is mounted on the spindle motor with a degree of eccentricity such that a linear velocity of the rotating recording surface relative to the read/write head changes as a result of the eccentricity and wherein the data sector size correction signal is modulated according to the linear velocity of the rotating recording surface.

9. The mobile host device of claim 7, further including a clock configured to generate a fixed frequency clock signal, the clock signal being coupled to the sector size collector and wherein the sector size signal is asserted for an integer number of clock cycles of the clock signal.

* * * * *